United States Patent [19]
Wang

[11] Patent Number: 5,322,483
[45] Date of Patent: Jun. 21, 1994

[54] RENOVATED BICYCLE CHAIN
[75] Inventor: Wen B. Wang, Tainan Hsien, Taiwan
[73] Assignee: Yaban Chain Ind'l Co., Ltd., Tainan Hsien, Taiwan
[21] Appl. No.: 82,378
[22] Filed: Jun. 28, 1993
[51] Int. Cl.⁵ .............................................. F16E 13/00
[52] U.S. Cl. ...................................... 474/206; 474/212
[58] Field of Search ............... 474/206, 210, 212, 213, 474/214, 230, 232–234

[56] References Cited
U.S. PATENT DOCUMENTS
4,983,147  1/1991  Wu ................................. 474/212 X
5,151,066  9/1992  Wu .................................... 474/206

Primary Examiner—Thuy M. Bui
Attorney, Agent, or Firm—Morton J. Rosenberg; David I. Klein

[57] ABSTRACT

A renovated bicycle chain includes generally an inner chain plate and an outer chain plate. The inner chain plate includes a pair of arcuate grooves at inner end of a pair of pin holes, respectively adopted to receive a corresponding arcuate protrusions extending from the inner end of a pin hole of the outer chain plate. Both inner and outer chain plates have an aperture at center with an angular groove adopted to accommodate the outer edge when inner and outer chain plates are connected. Luminescent emission diodes also may be applied to the chain plates as a warning system.

2 Claims, 7 Drawing Sheets

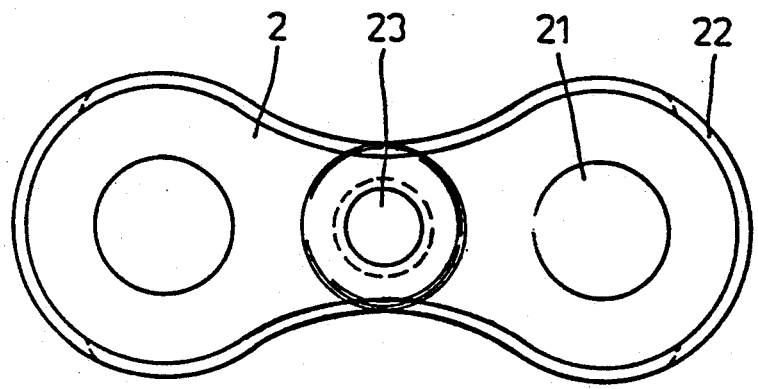
F I G. 3
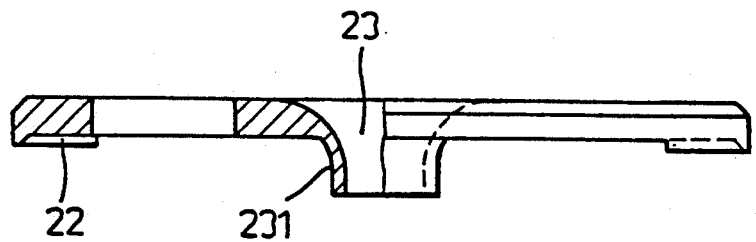
F I G. 4

RENOVATED BICYCLE CHAIN

FIELD OF THE INVENTION

This invention relates to a bicycle chain, more particularly, a chain including an inner chain plate having a pair of arcuate grooves in correspondence to a pair of arcuate protrusions on an outer chain plate for securely connection purpose.

BACKGROUND OF THE INVENTION

Monocycles had been invented at long time ago for the benefit of running faster and easier. Bicycles were later invented for people may easily get balance on a bicycle than a monocycle. To drive a bicycle, chain plate and discs are two essential equipment. However, the original chain plate, as shown in FIGS. 8, 9, and 10, exists too much clearance for the purpose of switching gears and the clearance may cause noise, jams or disengagement.

The inventor, in view of this, has invented the present invention to improve the above-mentioned shortcomings

SUMMARY OF THE INVENTION

It is the primary object of the present invention to provide a bicycle chain which inner chain plates and outer chain plates engage securely and eliminate disengagement when switching gears.

It is another object of the present invention to provide a bicycle chain which inner and outer chain plates have an angular groove adopted to guide gears to slide in easily.

It is a further object of the present invention to provide a bicycle chain which is easy to be lubricated and radiate heat.

BRIEF DESCRIPTION OF THE DRAWINGS

FIG. 3 is a top view of an outer chain plate of the present invention;

FIG. 4 is a side view of FIG. 3, partially sectioned;

DETAILED DESCRIPTION OF THE PREFERRED EMBODIMENTS

Figure 1:
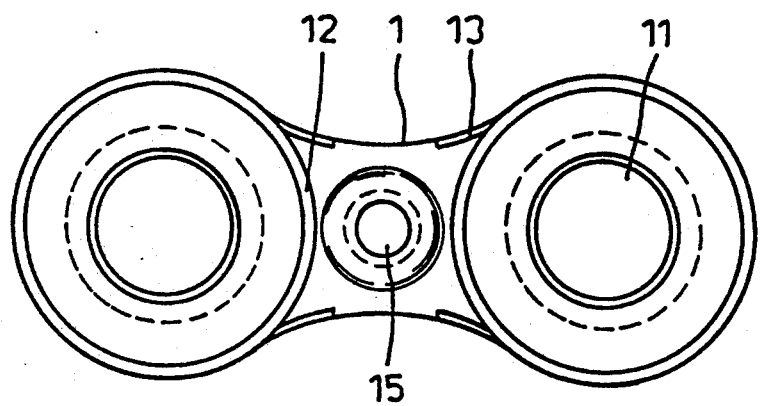
FIG. 1 is a top view of an inner chain plate of the present invention.
Figure 2:
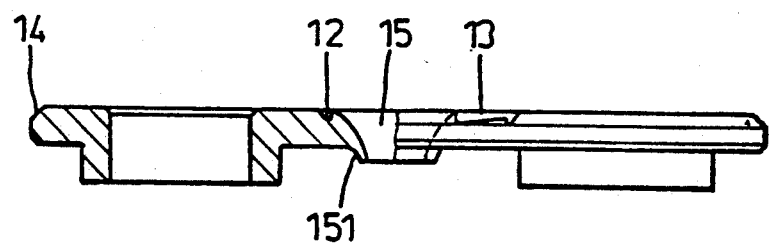
FIG. 2 is a side view of FIG. 1, partially sectioned.

Referring now to the drawings wherein the showings are for the purpose of illustrating the preferred embodiments only and not for the purpose of limiting the same, in FIGS. 1, 2 there is shown an inner chain plate 1 according to the present invention having a pair of pin holes 11 at respective ends, two arcuate grooves 12 at inner ends of each hole 11, four slanted flanks 13 at respective sides of the arcuate grooves 12, bevel angles 14 are formed at respective ends of the plate 1, and an aperture 15 at center having an angular groove 151 surrounding thereat. The side where arcuate grooves 12 are located are defined as inner surface.

An outer chain plate 2, according to FIGS. 3, 4, includes also a pair of pin holes 21 at respective ends having a pair of arcuate protrusions 22 at respective ends of the plate 2 in correspondence to the arcuate grooves 12, an aperture 23 at center having an angular groove 231 surrounding thereat. The side where the arcuate protrusions 22 located are defined as inner surface.

Figure 5:
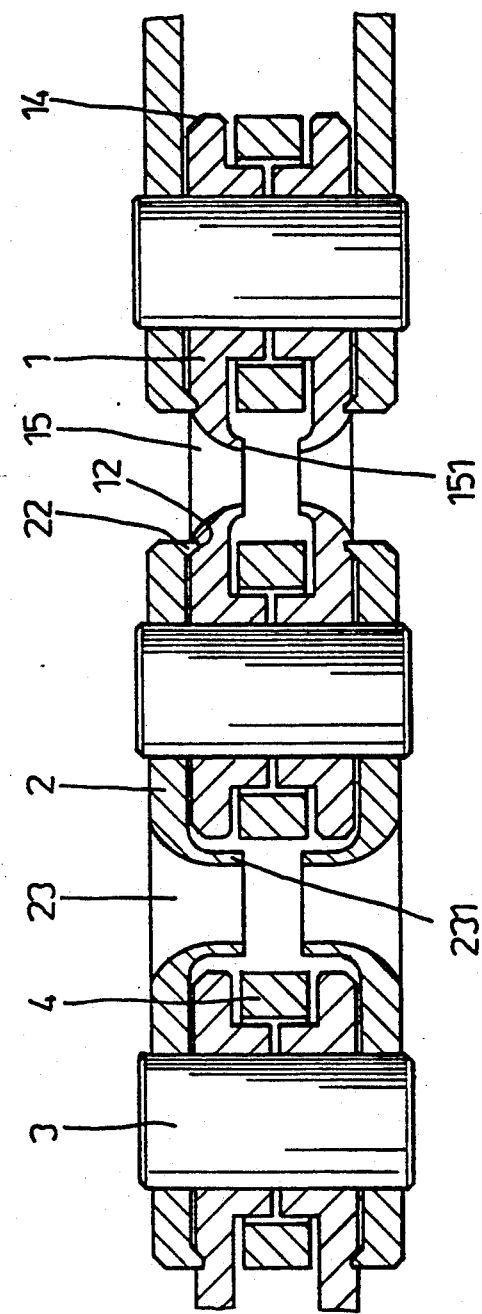
FIG. 5 is a top view of the present invention, partially sectioned.

To assemble the present invention, first connect a pin hole 11 of an inner chain plate 1 to a pin hole 21 of an outer chain plate 2 by pressing them together so that the arcuate protrusion 22 of the outer chain plate 2 clips into the arcuate groove 12, as shown in FIG. 5. Second, insert a pin 3 through the pin holes 11, 21 and the inner and the outer chain plates 1, 2 are swingly connected together while the pin holes at the other ends of each of the chain plates 1, 2 remain free for a continuous connection. A second inner chain plate 1 is connected to the pin hole 21 of the first outer chain plate 2 that is still remain free, and a second outer chain plate 2 is also connected to the pin hole 11 of the first chain plate 11 that is still remain free. By repeating this step until the chain plate has reached to the desired length, then connect the remaining free ends of the pin holes 11, 21 together to form a circle.

Figure 6:
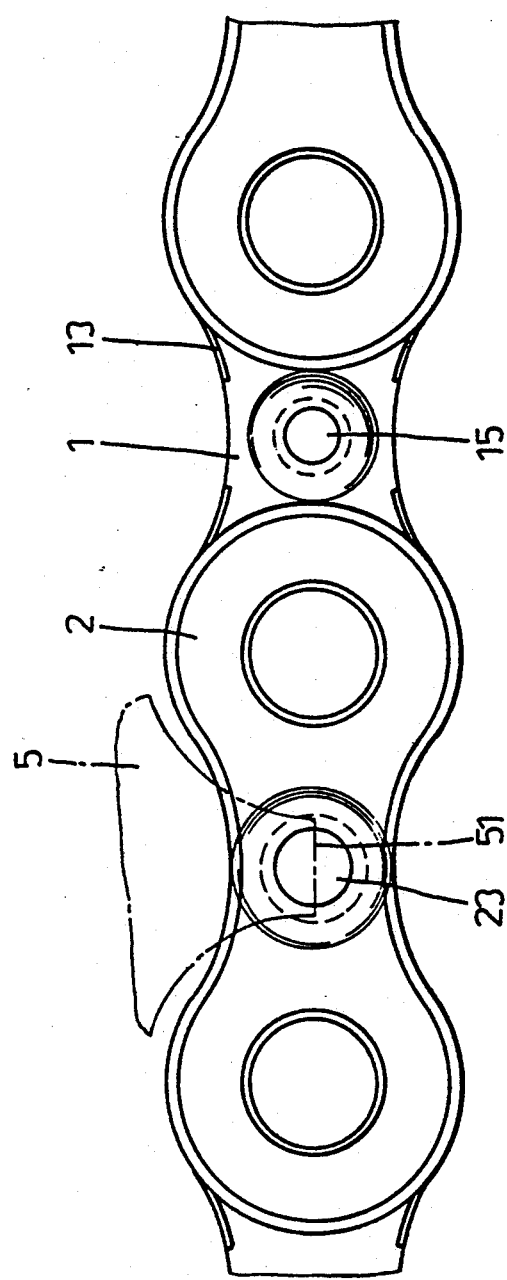
FIG. 6 is a side view of FIG. 5.

The slanting flanks 13 of each inner chain plate 1 lead the gear 51 of the disc 5, as shown in FIG. 6 in between the inner and the outer chain plates 1, 2 to illuminate the possibility of jammed or disengaged. The apertures 15, 23 are adopted to drain lubricant which flows through the angular grooves 151, 231 into the clearance between the chain plates 1, 2 and the disc 5 to radiate heat caused from friction.

Figure 7:
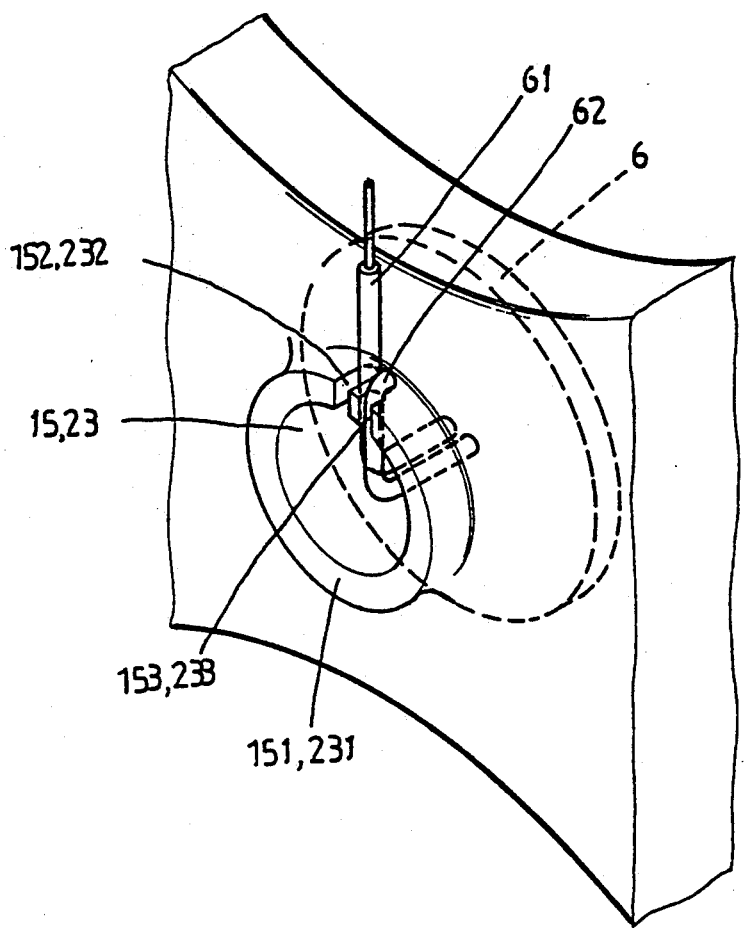
FIG. 7 perspective view of an inner chain plate of a second embodiment.
Figure 8:
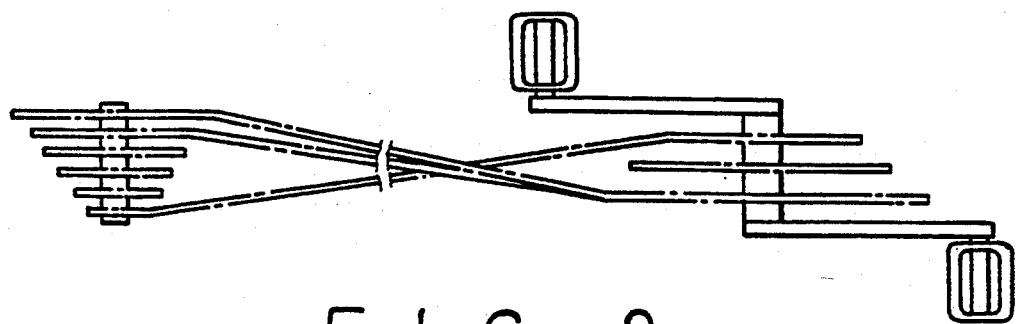
FIGS. 8, 9, 10 are prior arts.
Figure 9:
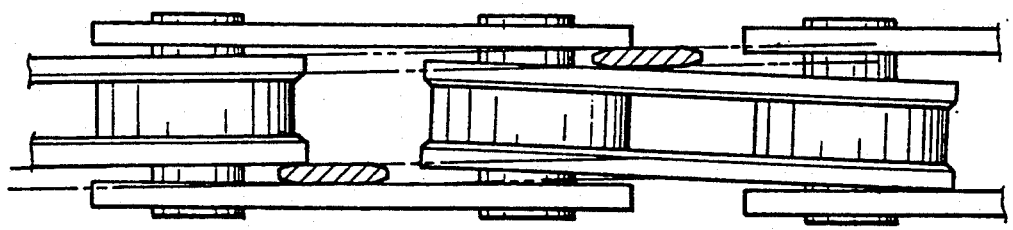
Figure 10:
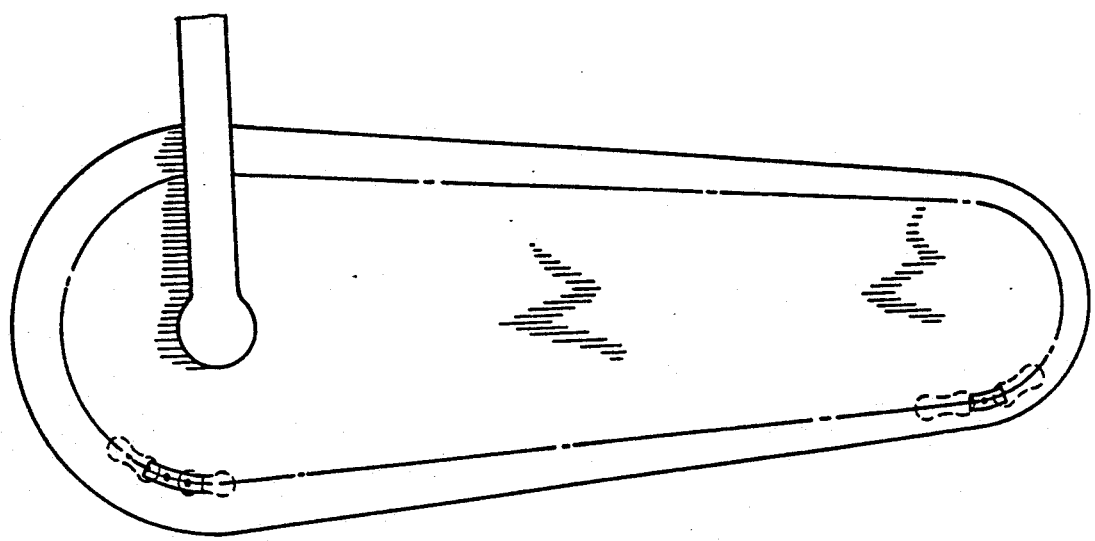

FIG. 7 shows a second embodiment which includes a luminescent emission diode 6 located in the aperture 15 or 23 having a positive foot 61 extending through a long trough 152, 232, and a negative foot 62 extending through a short trough 153 and/or 233. The LED will luminescence when it is charged as a safety device to the bicycle rider.

The invention has been described with reference to the preferred embodiments. The invention includes a recognition of the problems affect the engagement of chain and gears of a bicycle and the safety of riders. Other obvious improvements to the improvements suggested herein (and other than those which have been discussed herein) are intended to be included within the invention in so far as they come within the scope of the patent as claimed or equivalents thereof.

I claim:

1. A renovated bicycle chain essentially comprising an inner chain plate and an outer chain plate and being characterized in that:

said inner chain plate having a pair of pin holes at respective ends, a pair of arcuate grooves at inner ends of said pin holes, four slanting flanks at respective sides of said arcuate grooves, an aperture at center adopted to drain lubricant therefrom, and an angular groove at one side surrounding said aperture adopted to guide gears to slip therein;

said outer chain plate having also a pair of pin holes at respective ends, a pair of arcuate protrusions at respective endmost of said pin holes adopted to be clipped into said arcuate groove of said inner chain plate, an aperture at center adopted to drain lubricant therefrom having an angular groove surrounding thereat adopted to guide gears to slip therein.

2. A renovated bicycle chain of claim 1, wherein each of said apertures of said inner and outer chain plates includes a luminescent emission diode.

* * * * *